United States Patent
Khoo et al.

(10) Patent No.: US 7,124,091 B1
(45) Date of Patent: Oct. 17, 2006

(54) METHOD AND SYSTEM FOR ORDERING AN ADVERTISING SPOT OVER A DATA NETWORK

(75) Inventors: Denis Khoo, Arcadia, CA (US); Raymond F. Ratcliff, III, Plano, TX (US)

(73) Assignee: Individual Network, LLC, West Palm Beach, FL (US)

( * ) Notice: Subject to any disclaimer, the term of this patent is extended or adjusted under 35 U.S.C. 154(b) by 558 days.

(21) Appl. No.: 09/625,832

(22) Filed: Jul. 26, 2000

Related U.S. Application Data (63) Continuation-in-part of application No. 09/487,120, filed on Jan. 19, 2000, now Pat. No. 6,434,747.

(51) Int. Cl.
*G06F 17/60* (2006.01)

(52) U.S. Cl. .............................. 705/14; 705/1; 705/26; 705/27; 705/10

(58) Field of Classification Search .................. 705/14, 705/1, 10, 25–27
See application file for complete search history.

(56) References Cited

U.S. PATENT DOCUMENTS

| | | | |
|---|---|---|---|
| 4,745,549 A | 5/1988 | Hashimoto |
| 4,789,863 A | 12/1988 | Bush |
| 4,947,429 A | 8/1990 | Bestler |
| 4,995,078 A | 2/1991 | Monslow |
| 5,075,771 A | 12/1991 | Hashimoto |
| 5,130,792 A | 7/1992 | Tindell |
| 5,155,591 A | 10/1992 | Wachob |
| 5,367,330 A | 11/1994 | Haave |
| 5,371,551 A | 12/1994 | Logan |
| 5,446,919 A | 8/1995 | Wilkins |
| 5,459,506 A | 10/1995 | Bushnell |
| 5,479,508 A | 12/1995 | Bestler |
| 5,483,472 A | 1/1996 | Overman |
| 5,508,731 A | 4/1996 | Kohorn |
| 5,532,735 A | 7/1996 | Blahut |
| 5,572,442 A | 11/1996 | Schulhof |
| 5,600,364 A | 2/1997 | Hendricks |
| 5,604,542 A | 2/1997 | Dedrick |
| 5,610,653 A | 3/1997 | Abecassis |

(Continued)

FOREIGN PATENT DOCUMENTS

EP    0 355 697    2/1990

(Continued)

OTHER PUBLICATIONS

"An empirical analysis of the demand for commercial television advertising" by Masih, Rumi, Applied Economics, 31, 2, 149(1), Feb. 1999, DIALOG(R) File 148, Record #10925691.*

*Primary Examiner*—Eric Stamber
*Assistant Examiner*—Khanh H. Le
(74) *Attorney, Agent, or Firm*—DLA Piper US LLP (57) ABSTRACT

The present invention provides for a method for ordering an advertising spot for an advertisement over a data network to be transmitted to a target user during a transmission of a motion picture. An advertiser first provides to a broadcaster a predetermined constraint that defines the target user for receiving the advertisement. Then, the broadcaster uses the predetermined constraint to determine a price for the advertising spot. The price is then offered by the broadcaster to the advertiser and the advertiser then orders the advertising spot based on the price to place the advertisement in the advertising spot to be transmitted to the target user during the transmission of a motion picture.

65 Claims, 8 Drawing Sheets

U.S. PATENT DOCUMENTS

| | | |
|---|---|---|
| 5,616,876 A | 4/1997 | Cluts |
| 5,621,456 A | 4/1997 | Florin et al. |
| 5,640,002 A | 6/1997 | Ruppert |
| 5,721,827 A | 2/1998 | Logan |
| 5,724,521 A | 3/1998 | Dedrick |
| 5,732,216 A | 3/1998 | Logan |
| 5,734,720 A | 3/1998 | Salganicoff |
| 5,745,710 A | 4/1998 | Clanton et al. |
| 5,752,238 A | 5/1998 | Dedrick |
| 5,758,259 A | 5/1998 | Lawler |
| 5,761,683 A | 6/1998 | Logan |
| 5,781,909 A | 7/1998 | Logan |
| 5,794,210 A | 8/1998 | Goldhaber |
| 5,801,747 A | 9/1998 | Bedard |
| 5,802,299 A | 9/1998 | Logan |
| 5,818,512 A | 10/1998 | Fuller |
| 5,838,314 A | 11/1998 | Neel |
| 5,848,396 A | 12/1998 | Gerace |
| 5,848,397 A | 12/1998 | Marsh et al. |
| 5,861,881 A | 1/1999 | Freeman et al. |
| 5,861,906 A | 1/1999 | Dunn |
| 5,892,536 A | 4/1999 | Logan |
| 5,931,901 A | 8/1999 | Wolfe |
| 5,986,692 A | 11/1999 | Logan |
| 6,002,393 A | 12/1999 | Hite et al. |
| 6,012,080 A | 1/2000 | Ozden |
| 6,020,912 A | 2/2000 | DeLang |
| 6,026,376 A | 2/2000 | Kenney |
| 6,029,045 A | 2/2000 | Picco |
| 6,057,872 A | 5/2000 | Candelore |
| 6,088,455 A | 7/2000 | Logan |
| 6,088,722 A | 7/2000 | Herz et al. |
| RE36,801 E | 8/2000 | Logan |
| 6,101,483 A | 8/2000 | Petrovich |
| 6,131,087 A * | 10/2000 | Luke et al. .................... 705/26 |
| 6,177,931 B1 | 1/2001 | Alexander et al. |
| 6,199,076 B1 | 3/2001 | Logan |
| 6,211,901 B1 | 4/2001 | Imajima et al. |
| 6,216,129 B1 * | 4/2001 | Eldering ...................... 707/10 |
| 6,237,145 B1 | 5/2001 | Narasimhan |
| 6,246,997 B1 | 6/2001 | Cybul |
| 6,324,338 B1 | 11/2001 | Wood |
| 6,324,519 B1 | 11/2001 | Eldering |
| 6,336,100 B1 | 1/2002 | Yamada |
| 6,386,450 B1 | 5/2002 | Ogasawara |
| 6,457,010 B1 | 9/2002 | Eldering |
| 6,477,704 B1 | 11/2002 | Cremia |
| 6,484,146 B1 | 11/2002 | Day |
| 6,526,577 B1 | 2/2003 | Knudsen |
| 6,571,216 B1 | 5/2003 | Garg |
| 6,571,279 B1 * | 5/2003 | Herz et al. .................. 709/217 |
| 6,571,390 B1 | 5/2003 | Dunn |
| 6,668,377 B1 | 12/2003 | Dunn |
| 2001/0003845 A1 | 6/2001 | Tsukamoto |
| 2001/0021994 A1 | 9/2001 | Nash |
| 2002/0083444 A1 | 6/2002 | Blasko et al. |
| 2002/0144153 A1 | 10/2002 | Levine |

FOREIGN PATENT DOCUMENTS

| | | |
|---|---|---|
| EP | 1133745 A1 | 9/2001 |
| EP | 1172000 A1 | 1/2002 |
| WO | WO 99/37045 | 7/1999 |
| WO | WO 00/33228 | 6/2000 |
| WO | WO 00/64165 | 10/2000 |

* cited by examiner

METHOD AND SYSTEM FOR ORDERING AN ADVERTISING SPOT OVER A DATA NETWORK

This application is a continuation-in-part of U.S. patent application Ser. No. 09/487,120 filed Jan. 19, 2000 and issued as U.S. Pat. No. 6,434,747 on Aug. 13, 2002, the content of which is incorporated herein in its entirety.

BACKGROUND OF THE INVENTION

1. Field of the Invention

The present invention relates generally to data networks, and more particularly, to a method and system for ordering advertising spots for advertisements over a data network to a target user during the transmission of motion pictures.

2. Description of the Related Art

The delivery of advertisements to viewers of television programs has been based on an inefficient and wasteful model that does not reach the true target audience for the advertisement being shown. That is, the present paradigm for pricing and delivery of advertisements does not deliver the advertisement to only those viewers who should be targeted for that advertisement. This problem is best explained with reference to prior art FIG. 1.

Figure 1:
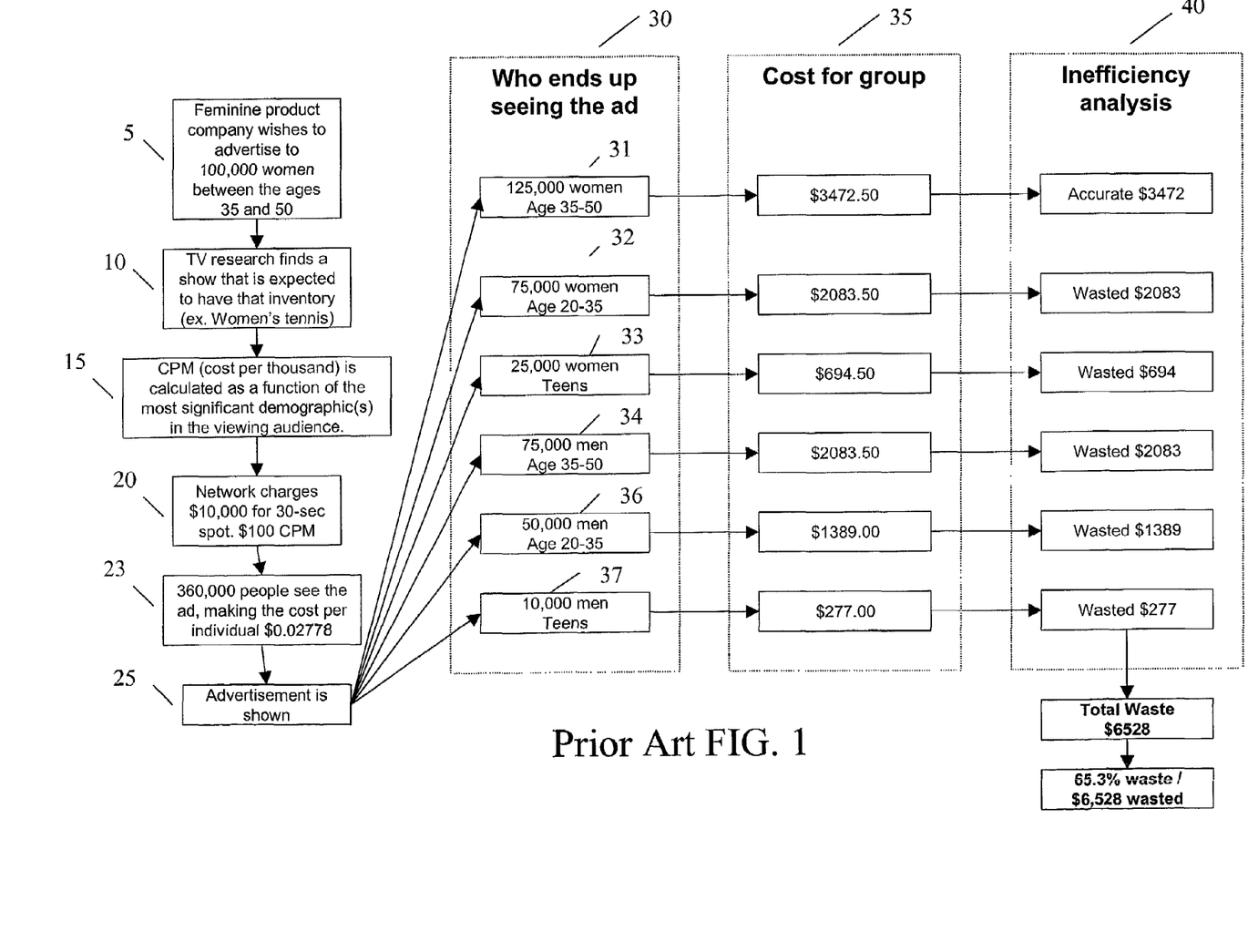
FIG. 1 is a block diagram view of a conventional pricing model for pricing and delivery of advertisements.

Prior art FIG. 1 is a block diagram view of the present advertisement pricing model. In prior art FIG. 1, an example is provided for ordering an advertising spot by a feminine product company for a feminine hygiene product to be viewed by 100,000 women between the ages of 35 and 50. The "demographics" in this example include a number (100,000 individuals), a gender (women) and an age (between 35 and 50). This is shown at box 5 of prior art FIG. 1. Then at box 10, the television broadcaster or similar entity researches the television shows to determine which shows satisfy all, or a significant portion of all, demographics requested by the feminine product company at box 5. In the example of prior art FIG. 1, the television show chosen is women's tennis. At box 15, the cost per 1,000 (CPM) is calculated as a function of the most significant demographic in the viewing audience. That is, not all television shows may satisfy the three demographics (number (100,000), gender (women) and ages (35–50)), but a particular television show may have a significant percentage of those three demographics. Based on that CPM, at box 20, the television broadcaster charges a price ($10,000 for a 30-second spot) which is essentially a $100 CPM. The actual number of viewers is 360,000 people at box 23. Then at box 25, the advertisement is shown on the television during a television show.

The waste with the pricing model shown in prior art FIG. 1 is explained by reference to boxes 30, 35 and 40 which demonstrate the demographics of the individuals that actually view the advertisement (box 30), the cost per individual (box 35) based on the $10,000 charge by the television broadcaster and the inefficiency analysis (box 40) that results using this pricing model. At box 30, six different groups of individuals actually viewed the advertisement (box 31). Specifically, from box 30, 125,000 women between the ages of 35 and 50 viewed the advertisement; however, individuals with different, non-targeted demographics also viewed the advertisement. Those individuals include 75,000 women between the ages of 20 to 35 (box 32), 25,000 women that are teenagers (box 33), 75,000 men ages 35 to 50 (box 34), 50,000 men ages 20 to 35 (box 36) and 10,000 men in their teens (box 37). Essentially, the advertisement was placed in this television show (e.g. women's tennis) based on the 125,000 women ages 35 to 50. However, the remaining viewers (boxes 31, 32, 33, 34, 36, 37) are not individuals that the feminine product company wanted to show the advertisement to, yet the feminine product company is paying for those non-targeted individuals.

The amount that the feminine product company is paying for those individuals is shown in box 35. The costs per individuals as shown in box 35 are arbitrary costs based on the percentage of viewers of the total viewing audience multiplied by the $10,000 cost. Thus, in box 35, the 125,000 women ages 35 to 50 have a cost of $3,472.50 for the group shown while the other costs for the non-targeted individuals is also directly proportional to the percentage of the number of individuals who see the advertisement (box 30) to the total viewers (360,000). In box 40, the inefficiency analysis is shown where only the costs of the group of the 125,000 women ages 35 to 50 (box 31) are accurate and all the remaining individuals viewing the tennis match are wasted. In conclusion, only $3,472.50 of the $10,000.00 total costs for all individuals is accurate, resulting in a waste of 65.3%. This correlates to a waste of $6,528.00 of the $10,000.00 paid for the advertisement because only approximately 35% of the individuals viewing the advertisement were in the target audience.

Prior art FIG. 1 exemplifies the limitations in the prior art in that estimates based on group demographics are inefficient and wasteful. A need exists for an advertisement system that targets the advertising to particular individuals rather than a group. In addition, the feminine product company is paying the same costs per individual for all the 125,000 women between the ages 35 and 50, when the women closer to a particular age in that range (e.g., 35 years old) may be a better target for the company than women at the other end of that range (e.g., 50 years old). Therefore, there is a further need to be able to highly individualize the targeted audience on a person-by-person basis rather than on a group basis.

SUMMARY OF THE INVENTION

The present invention provides for a method for ordering an advertising spot for an advertisement over a data network to be transmitted to a target user during a transmission of a motion picture. An advertiser first provides to a broadcaster a predetermined constraint that defines the target user for receiving the advertisement. Then, the broadcaster uses the predetermined constraint to determine a price for the advertising spot. The price is then offered by the broadcaster to the advertiser and the advertiser then orders the advertising spot based on the price to place the advertisement in the advertising spot to be transmitted to the target user during the transmission of a motion picture.

In a further embodiment, a method for determining the price for the advertising spot for transmitting the advertisement to a target user during a motion picture is also provided. This method includes providing to a broadcaster, by an advertiser, a predetermined constraint defining the target user to receive the advertisement. Then, the broadcaster searches an individual inventory containing a plurality of individuals where each of the plurality of individuals has a profile. The searching is performed to determine the target user by comparing each of the profiles of the plurality of individuals to the predetermined constraint to locate a match between the profiles of the plurality of individuals and the predetermined constraint. Once matched, a cost is determined for each of the plurality of individuals based on a predetermined formula and the costs of each of the plurality of individuals are totaled to determine the price for the advertising spot.

The method of the present invention is embodied in both software and hardware embodiments in the present invention.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein.

Prior art

DETAILED DESCRIPTION OF THE PREFERRED EMBODIMENTS

Figure 2:
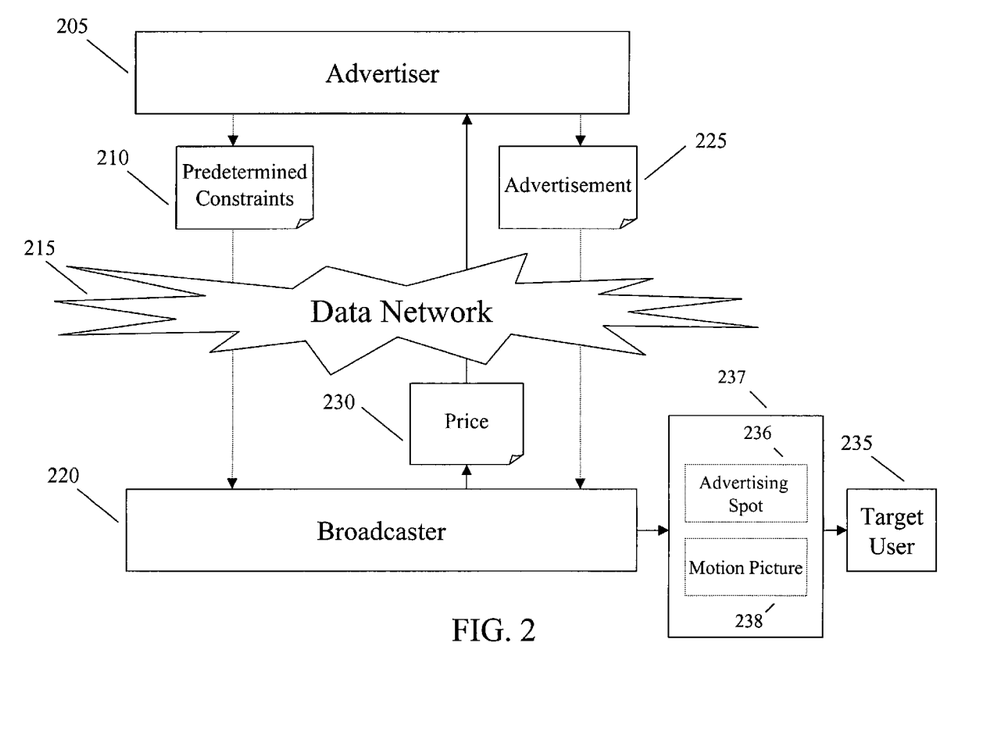
FIG. 2 is a block diagram view of an embodiment for the method for ordering an advertising spot for an advertisement over a data network of the present invention.

FIG. 2 is a block diagram view of an embodiment of the method for ordering an advertising spot for an advertisement over a data network. In FIG. 2, an advertiser 205 wishes to order an advertising spot 236 for an advertisement 225 over a data network 215. The advertisement is to be sent to a target user 235 by the broadcaster 220 during a transmission of a motion picture 238. In FIG. 2, the advertiser is an entity that wishes to place advertising content (e.g., commercials or other type of action calling attention to the public of the advertiser through paid announcements) to the target user 235. In order to get the advertisement 225 to the target user 235, the advertiser goes to a broadcaster 220 that is able to transmit the advertisement 225 to the target user 235 as part of a motion picture 238 incorporating or otherwise transmitting the advertising spot 236 within the motion picture 238. It is noted that the advertisement 225 may be sent either directly or indirectly from the advertiser to the broadcaster through intermediary entities, yet such indirect transmission of the advertisement falls within the scope of the present invention as claimed below. The advertiser 205 may be any company that wishes to publicly pay for announcements through the advertisement 225.

The advertiser has predetermined constraints 210 that are determined by the advertiser 205 in a variety of ways. The predetermined constraint 210 is any information regarding the target user 235 that the advertiser 205 wishes to view the advertisement 225. This includes, without limitation, information such as name, age, income, address, hobbies, hours of television watched per day, profession, gender, and any other type of information of a target user 235 that is suitable for purposes of marketing content, including advertisement 225, to a target user 235. The predetermined constraints 210 typically are determined by the advertiser based on research of its products or services being offered in order to reach the target user 235. These predetermined constraints 210 may be sent through a data network 215, for example, the Internet, or other network that exchanges data. The data network 215, in turn, sends the predetermined constraint, defining the target user 235 that will receive the advertisement 225, to the broadcaster 220 in order to determine a price for the advertising spot 236 that will be shown to the target user 235. Upon receiving the predetermined constraint 210, the broadcaster 220 uses the predetermined constraint 210 to determine the price by performing the method for determining a price for the advertising spot as described in detail below. The broadcaster 220, after having determined the price for the advertising spot, offers that price 230 to the advertiser 205 by returning the price 230 through the data network 215 to the advertiser 205. The advertiser then orders the advertising spot 236 for the advertisement 225 based on the price 230 by sending to the broadcaster 220, through the data network 215, an order for the advertising spot. The advertising spot is then transmitted to the target user 235 during the transmission of a motion picture. The target user 235 is any individual viewing the motion picture 238.

In use, the system of FIG. 2 operates as follows. An advertiser 205 communicates with a data network 215 by logging on to the Internet 215 as is well known in the art through a computer system, such as the computer of FIG. 8. Once on the Internet, the advertiser 205 locates the broadcaster on the Internet through a web site of the broadcaster 220. Once at the web site (URL) of the broadcaster 220, the advertiser 205 sends the predetermined constraints 210 to the broadcaster 220 through the data network 215. This may be performed by entering a predetermined constraint 210, such as the name, age, gender, income, address, hobbies, hours of television watched per day profession etc. defining the target user 235, into the web site that is sent across the data network 215 to the broadcaster 220. Again, it is noted that the advertiser 205 enters the predetermined constraints 210 into a computer system such as the computer system described with regard to FIG. 8 below. Once the predetermined constraints 210 are sent to the broadcaster 220, the broadcaster 220 uses the predetermined constraints 210 to determine a price 230 for the advertising spot 236. The broadcaster 220 determines the price for the advertising spot 236 by searching an individual inventory (FIG. 6) that is a database containing a plurality of individuals. The plurality of individuals each have a profile that generally describes the individual, much in a similar manner as the predetermined constraints. That is, the profile contains information such as age, gender, income, hobbies, and other information that generally describe each individual in the individual inventory. The broadcaster 220 searches the individual inventory comparing the profile to the predetermined constraints in order to make a match between the two. For example, in one embodiment, an individual in the individual inventory may be a 35-year-old woman with a skiing hobby. The advertiser 205 may have entered a predetermined constraint 210 of a woman between the ages of 30 and 40 having a hobby of outdoor activities. The broadcaster 220, by searching and comparing the predetermined constraints 210 (woman, ages 30–40, hobby of outdoors activities) to the profile of the individual inventory, is able to match the predetermined constraint 210 to the individual having the profile described in order to select that individual. Once that individual is selected, the broadcaster 220 determines a cost for that individual based on a predetermined formula described below in FIG. 5. Each individual is then totaled to determine the price 230 to send over the data network 215 to the advertiser 205 as the price for placing the advertisement 225 in the motion picture 238. Once the advertiser 205 receives the price 230, the advertiser 205 determines whether it wishes to place that advertisement in the motion picture 238 with the broadcaster 220, and if so, the advertiser 205 agrees to the price 230 by sending to the broadcaster 220, over the data network 215, the advertisement 225 and a confirmation to proceed with placing the advertisement 225 into the advertising spot 236 in the motion picture 238. Once the advertiser 205 receives the advertisement 225 and confirmation to proceed from the advertiser 205, which may or may not include payment of the price 230, the broadcaster 220 places the advertisement 225 into the advertising spot 236 to be shown to the target user 235.

The method of FIG. 2 contains a practical application in the technological arts of transmitting over a data network 215 a price 230 for individualized advertisement 225. That is, in the past, advertisements were placed into advertising spots in motion pictures based on group rates for certain demographics. As shown in prior art FIG. 1, this resulted in an inefficient pricing model where an advertiser paid for advertising to individuals that did not fall within the targeted audience all though a data network. Now, with the method and system of the present invention, the advertiser pays per individual, as opposed to a group of individuals, where each individual is within the target audience. There is therefore a cost savings to the advertiser because all advertisements are accurately shown to the desired target user.

Furthermore, from a broadcaster's perspective, the broadcaster may charge the advertiser for the specific number of individuals that are shown the advertisement, rather than sending the advertisement to both targeted individuals and non-targeted individuals. Additionally, with the present method and system of the present invention, the interests of the individuals in the individual inventory is much more focused where very specific hobbies and other type of information is known of the individual to more narrowly focus the advertisements related to those hobbies or other information to create a more effective and efficient advertising scheme. The present system further removes the need for any intermediary agency between the advertiser and broadcaster because the broadcaster contains the individual inventory and therefore does not need the services of an intermediary, such as an advertising agent, that may provide market research that links the demographics to the particular motion pictures.

Figure 3:
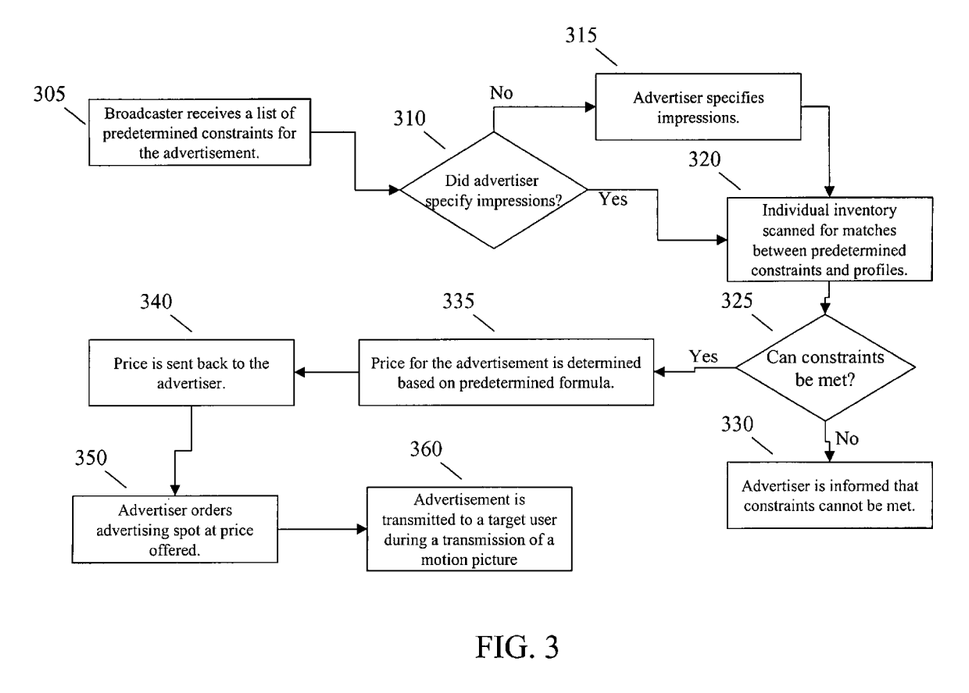
FIG. 3 is a flow chart of a further embodiment of the method for ordering an advertising spot for an advertisement over a data network.
Figure 5:
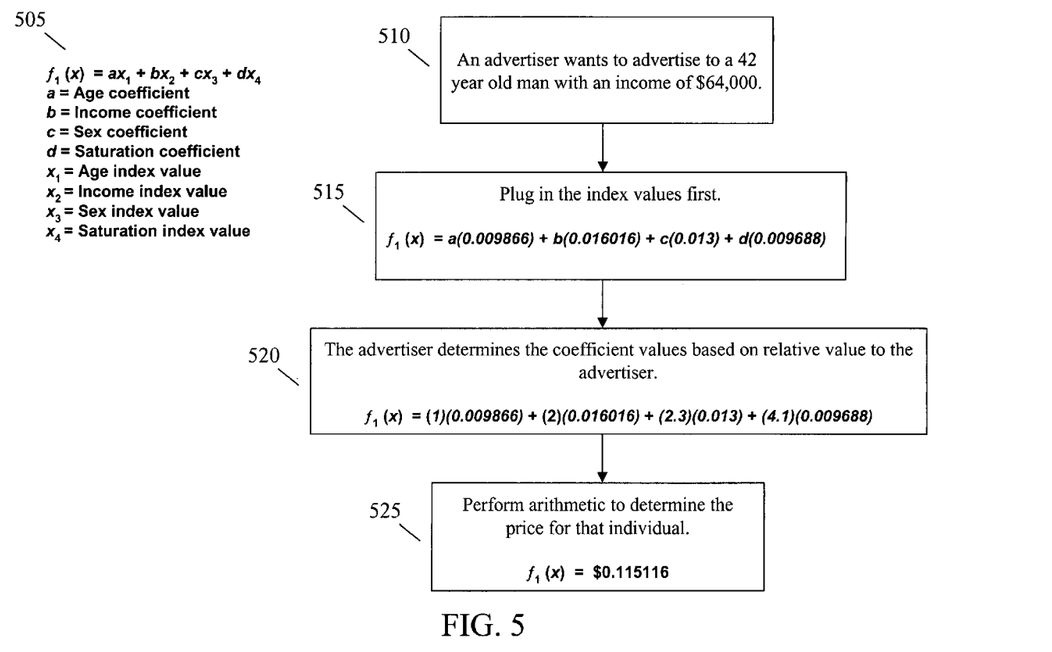
FIG. 5 is a block diagram view of an embodiment of the predetermined formula and an embodiment of the method for determining a price of the present invention.

FIG. 3 is a flow chart of an embodiment of the method for ordering an advertising spot for an advertisement over a data network. In FIG. 3, a broadcaster receives a list of predetermined constraints for an advertisement from the advertiser at 305. The broadcaster then determines whether the advertiser specified a minimum number of impressions (i.e. the number of instances that the advertisement will be shown). In one embodiment, the impressions are sent to the broadcaster over the data network when using the system of the present invention. If the advertiser did not specify the impression, then the broadcaster requests for that impression to be specified and the advertiser specifies the impressions at 315. If the advertiser did specify impressions, then the broadcaster scans the individual inventory at 320 for matches between the predetermined constraints and profiles of the individuals in the individual inventory. Then at 325, the broadcaster determines whether the predetermined constraints can be met which, if they cannot be met, the broadcaster informs the advertiser over the data network that the predetermined constraints cannot be met at 330. If the predetermined constraints can be met and matches are made between the predetermined constraints and the profiles of the individuals in the individual inventory, then the broadcaster determines a price for the advertisement based on the predetermined formula at 335. The price is determined using the method of determining a price for an advertising spot as shown in FIG. 5 below. Then at 340, the price is sent back to the advertiser over the data network and the advertiser orders the advertising spot at the price offered at 350 whereby the advertiser pays the price for the advertising spot and transmits the advertisement to the broadcaster. It is noted that, in one embodiment, the advertisement is sent to the broadcaster after a price has been agreed to between the advertiser and the broadcaster. However, in alternative embodiments, it is possible for the advertiser to send the advertisements at various times during the communication between the advertiser and broadcaster, even including when the advertiser transmits the predetermined constraints to the broadcaster. Lastly, at 360, the advertisement is transmitted to a target user during a transmission of a motion picture on a display device such as the display devices described with reference to FIG. 8 below.

Figure 4:
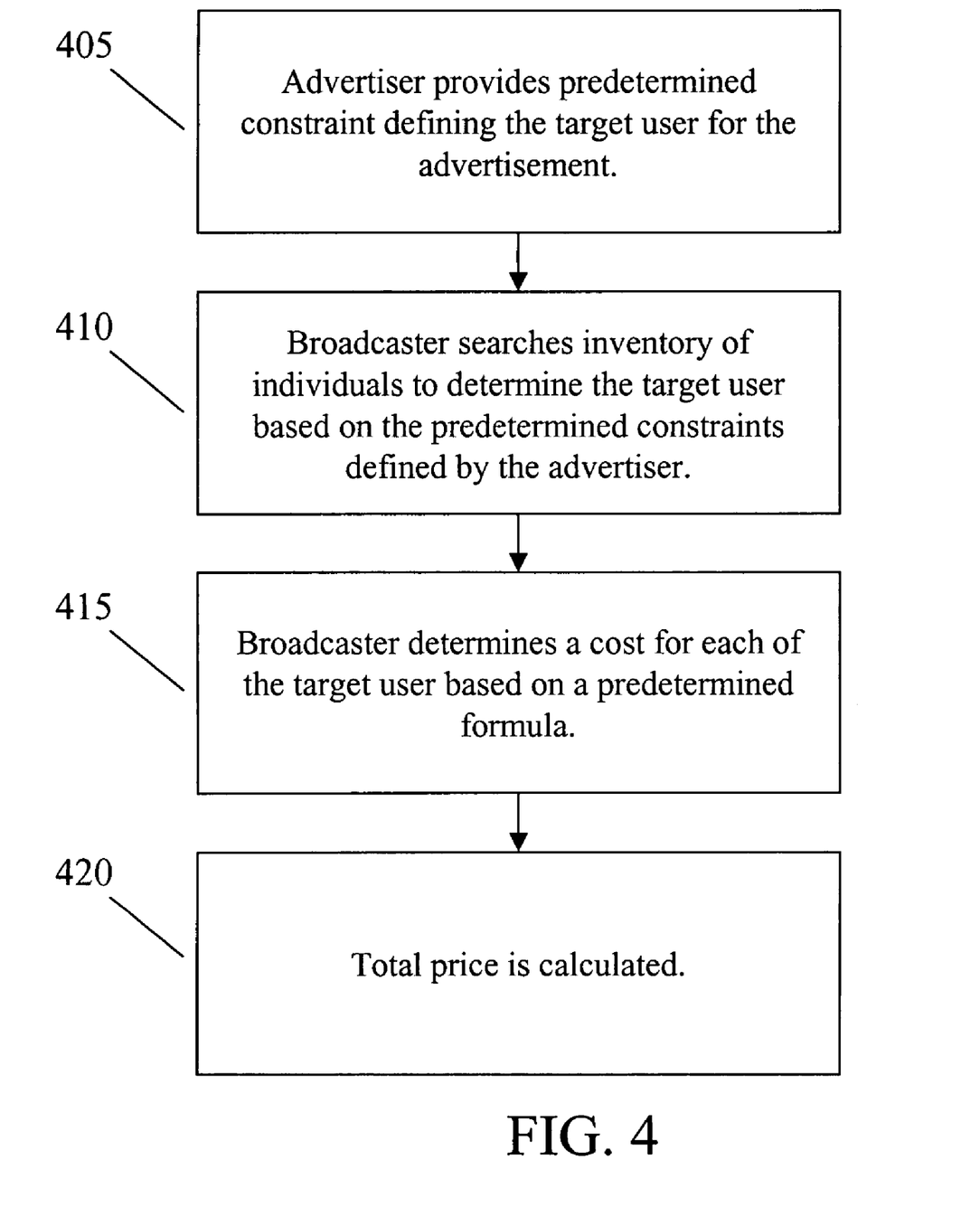
FIG. 4 is a flow chart of an embodiment of the method for determining a price for an advertising spot of the present invention.

FIG. 4 is a flow chart of an embodiment of the method for determining a price for an advertising spot of the present invention. In FIG. 4, an advertiser provides to a broadcaster a predetermined constraint that defines the target user to receive the advertiser at 405. Again, these predetermined constraints may include the gender, age, income, hobbies, and other information that describes the target user to receive the advertisement. Upon receipt of the predetermined constraints, the broadcaster searches a database of individual inventory to determine the target user based on the predetermined constraints defined by the advertiser at 410. Once a match is determined, the broadcaster determines a cost for each of the individuals from the individual inventory that have matched the profile that now become the target user based on a predetermined formula (FIG. 5) at 415. The cost for each individual is then added to determine a total price for the advertising spot at 420.

FIG. 5 is an embodiment of the method for determining a price in the method of the present invention. In FIG. 5, the predetermined constraints at 510, in this embodiment, include an age of 42, a gender of male and an income of between $50,000 and $100,000 annually. In the individual inventory, a 42-year-old man with an income of $64,000 annually is located. One embodiment of a predetermined formula 505 has been set forth in the embodiment of FIG. 5 that determines the cost per individual based on two criteria: index value 515 and coefficients 520. It is important to note that the predetermined formula 505 is only one embodiment of the type of predetermined formulas that may be used to determine the cost per individual in the individual inventory. In essence, the predetermined formula may be any formula that determines the demand on the individuals in the individual inventory. This demand may be based on the supply and demand of the specific individuals contained in the individual inventory, as well as the supply and demand from the advertiser. Thus, in FIG. 5, the index values are first inserted at 515 for $x_1$, $x_2$, $x_3$ and $x_4$. These index values, in this embodiment, are determined by the relative importance of the individual in the individual inventory to the broadcaster. That is, an individual in the individual inventory may have a higher or lower index value based on the demand for an individual by the broadcaster with certain demographics in higher demand. The demand for an individual from the advertiser creates a weighted significance upon which the predetermined formula is based. The weighted significance is defined as the amount of significance given to the coefficient values that is in turn based on the target individual's demand. In one embodiment, that demand may be based on the amount of time available for the target individual to receive an advertisement. Thus, if an individual is age 35 and male, for example, many advertisers may want to advertise to the individual which would raise the demand for the individual and lower the time available to the individual. Then at 520, the coefficient values for age, income, sex are inserted, added and the formula produces a price for that individual at 525. The coefficient values are based on the demand for the individual from the advertiser's perspective. Then, all the prices for the specific individuals matched are added to determine the total price for the advertising spot.

Figure 6:
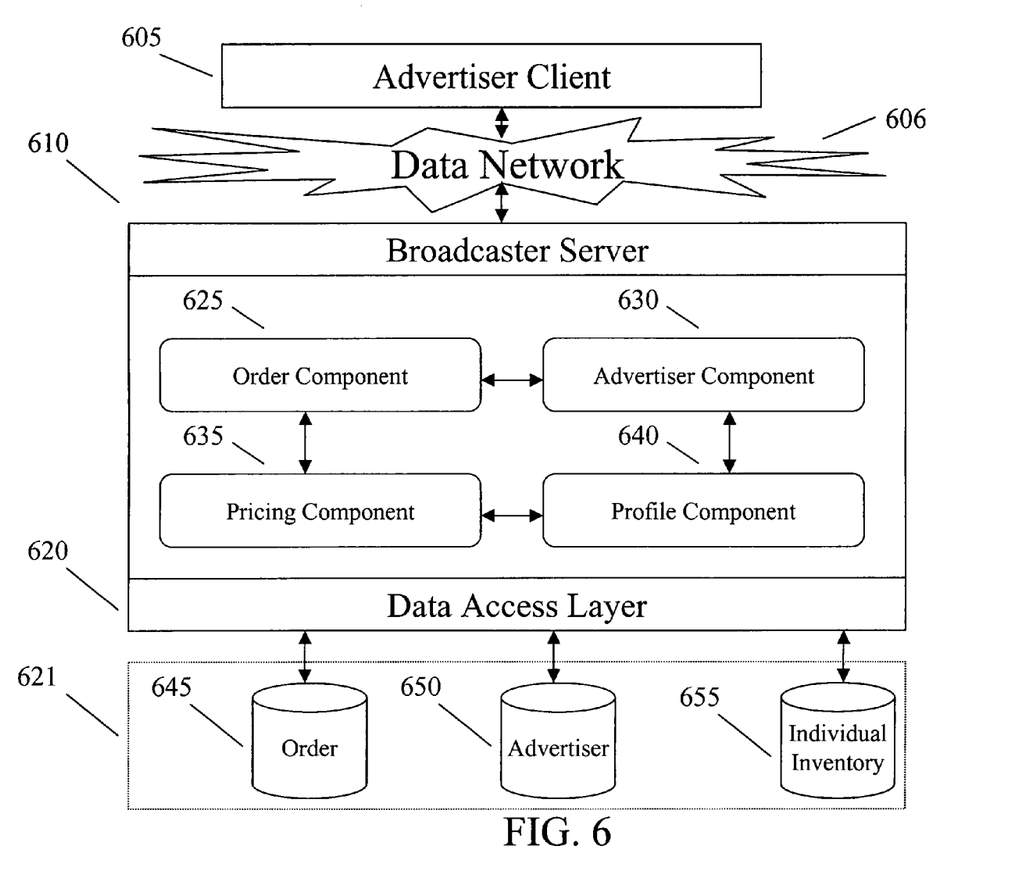
FIG. 6 is a block diagram view of an embodiment of the system of the present invention.

FIG. 6 is a block diagram view of an embodiment of the system of the present invention. In FIG. 6, three specific devices are shown including the advertiser client 605, the broadcaster server 610 and a storage device 621. The advertiser client 605 and the broadcaster server 610 may be computer systems, in one embodiment, such as the computer system of FIG. 8. In one embodiment, the advertiser client 605 and the broadcaster server 610 may be computer systems that can run software in order to perform the method and system of the present invention. The storage device 621 contains databases that may be located with the broadcaster server 610 or even in other storage mediums locally or remotely from the broadcaster server 610 as long as the storage device 621 remains in communication with the broadcaster server 610. The storage device 621 may be any of the storage devices described in FIG. 8 below. The advertiser client 605 permits an advertiser (not shown) to communicate with the broadcaster server 610 to provide to the broadcaster (not shown) the predetermined constraint as described in FIG. 2 above. The advertiser therefore uses the advertiser client 605 to send the predetermined constraints to the broadcaster server 610 over a data network 606. In an alternative embodiment, the broadcaster server 610 asks the advertiser client 605 for the predetermined constraint in order to determine a price for the advertising spot. This is performed by the order component 625 in the broadcaster server 610. Once the broadcaster server 610 requests the predetermined constraint, the advertiser client 605 provides the constraint through the data network 606 to the broadcaster server 610. The order component 625 receives the predetermined constraint from the advertiser client 605 and communicates with the pricing component 635 to transmit the predetermined constraint to the pricing component 635. It is noted that the components 625, 630, 635 and 640 of the broadcast server 620 are, in one embodiment, software modules written in well-known programming languages. The pricing component 635 then communicates with the advertiser component 630 and the profile component 640 in order to determine the price for the advertising spot. In turn, the advertising component 630 and the profile component 640 communicate with the individual inventory 655 in order to search the individual inventory 655 to compare the profile of the individuals in the individual inventory 655 with the predetermined constraints in order to find a match. After the matches have been found, the price for the individuals matched is determined by the pricing component 635 (using, e.g., the predetermined formula of FIG. 5) and summed to determine a total price for the advertising spot. That total price is then transmitted to the advertiser client 605 through the data network 606. The advertiser client 605 then approves the total price and transmits the advertisement to the broadcaster server 610. The broadcaster server 610 then places the order in a order database 645 and places the advertiser in the advertiser database 650. It is noted that the storage device 621 containing the order database 645, the advertiser database 650 and the individual inventory 655 is accessed by the broadcaster server 610 through the data access layer 620. It is further noted that the storage device 621 may be located within or without the broadcaster server 610, as long as the two are in communication.

Figure 7:
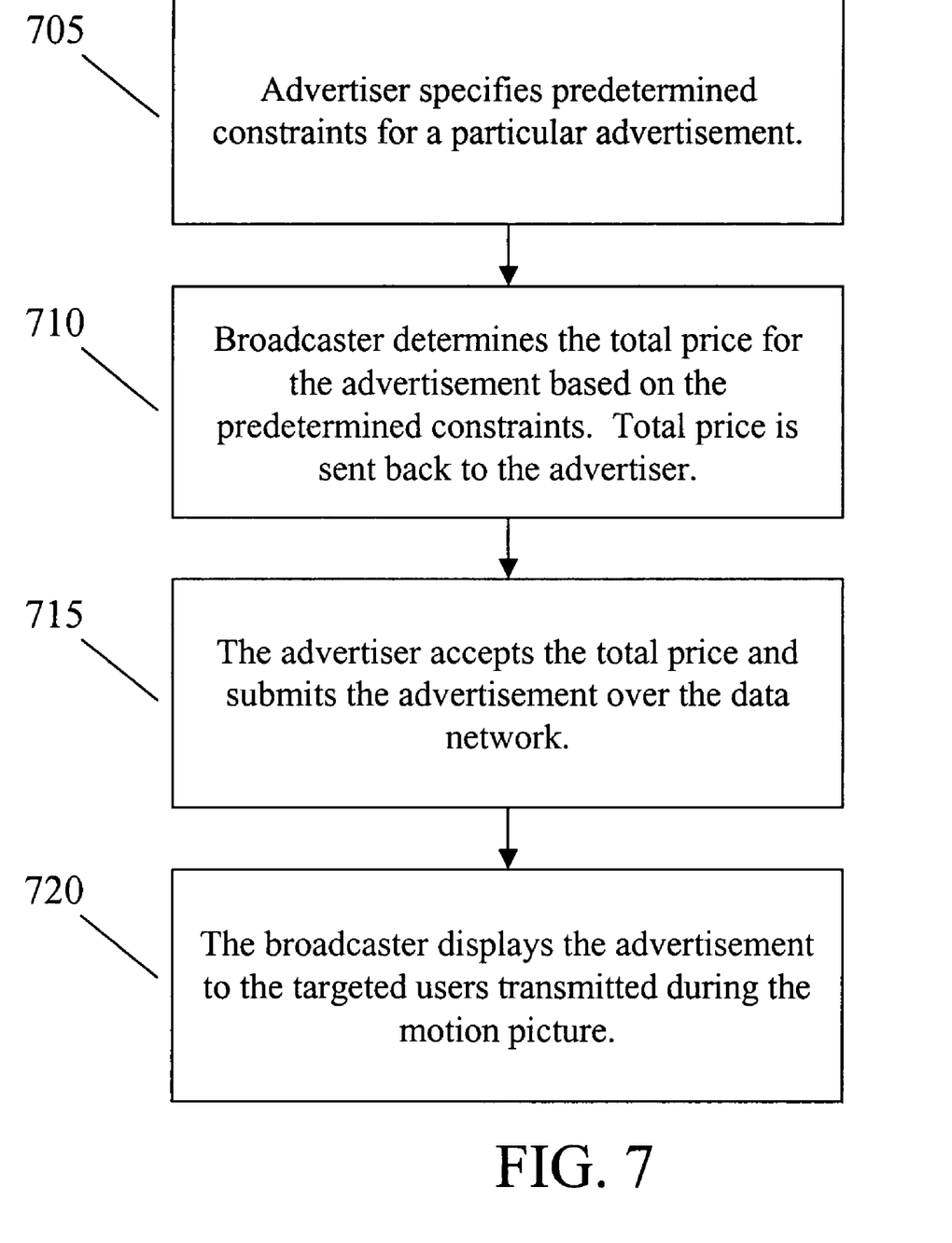
FIG. 7 is a flow chart of an embodiment of the method for ordering an advertising spot for an advertisement of the present invention.

FIG. 7 is flow chart of an embodiment of the method for ordering an advertising spot of the present invention. In FIG. 7, the advertiser specifies the predetermined constraints for an advertisement at 705. Then, at 710, the broadcaster determines the price for the advertisement based on the predetermined constraints and returns a total price to the advertiser over the data network. The advertiser then accepts the total price and submits the advertisements to the broadcaster over the data network at 715. Then at 720, the broadcaster displays the advertisement to the target users while transmitting the motion picture.

Figure 8:
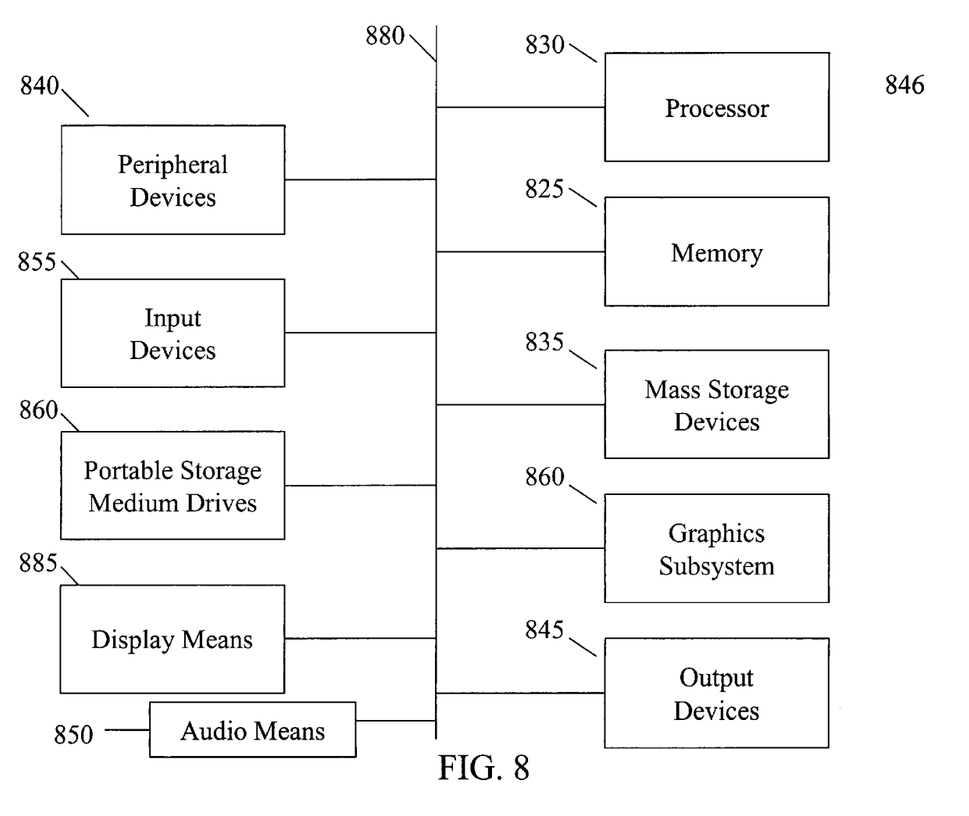
FIG. 8 is an embodiment of a computer system implementing the method and system of the present invention.

FIG. 8 illustrates a high-level block diagram of a general purpose computer system which is used, in one embodiment, to implement the method and system of the present invention. The general purpose computer 846, in one embodiment, acts as either the broadcaster server 610 or advertiser client 605 of FIG. 6. The general purpose computer 846 of FIG. 8 includes a processor 830 and memory 825. Processor 830 may contain a single microprocessor, or may contain a plurality of microprocessors, for configuring the computer system as a multi-processor system. Memory 825, stores, in part, instructions and data for execution by processor 830, e.g. the components 625, 630, 635, 640 of the broadcaster server 610. If the system of the present invention is wholly or partially implemented in software, including computer instructions, memory 825 stores the executable code when in operation. Memory 825 may include banks of dynamic random access memory (DRAM) as well as high speed cache memory.

The computer system 846 of FIG. 8 further includes a mass storage device 835, peripheral device(s) 840, audio means 850, input device(s) 855, portable storage medium drive(s) 860, a graphics subsystem 880 and a display means 885. For purposes of simplicity, the components shown in FIG. 8 are depicted as being connected via a single bus 880 (i.e. transmitting means). However, the components may be connected through one or more data transport means (e.g. Internet, Intranet, etc.). For example, processor 830 and memory 825 may be connected via a local microprocessor bus, and the mass storage device 835, peripheral device(s) 840, portable storage medium drive(s) 860, and graphics subsystem 880 may be connected via one or more input/output (I/O) buses. Mass storage device 835, which is typically implemented with a magnetic disk drive or an optical disk drive, is in one embodiment, a non-volatile storage device for storing data and instructions for use by processor 830. The mass storage device 835 includes the storage medium of embodiments of the present invention, and the server storage medium and client storage medium in alternative embodiments. In another embodiment, mass storage device 835 stores the components of the broadcaster server 610. In another embodiment, the storage device 621 may also be the mass storage device 835. The computer instructions that implement the method of the present invention also may be stored in processor 830.

Portable storage medium drive 860 operates in conjunction with a portable non-volatile storage medium, such as a floppy disk, or other computer-readable medium, to input and output data and code to and from the computer system of FIG. 8. In one embodiment, the method of the present invention that is implemented using computer instructions is stored on such a portable medium, and is input to the computer system 846 via the portable storage medium drive 860. Peripheral device(s) 840 may include any type of computer support device, such as an input/output (I/O) interface, to add additional functionality to the computer system 846. For example, peripheral device(s) 840 may include a network interface card for interfacing computer system 846 to a network, a modem, and the like.

Input device(s) 855 provide a portion of a user interface. Input device (s) 855 may include an alpha-numeric keypad for inputting alpha-numeric and other key information, or a pointing device, such as a mouse, a trackball, stylus or cursor direction keys. In order to display textual and graphical information, the computer 846 of FIG. 8 includes graphics subsystem 880 and display means 885. Display means 885 may include a cathode ray tube (CRT) display, liquid crystal display (LCD), other suitable display devices, or means for displaying, that enables a user to view the motion picture. Graphics subsystem 880 receives textual and graphical information and processes the information for output to display 885. The computer system 846 of FIG. 8 also includes an audio system 850. In one embodiment, audio means 850 includes a sound card that receives audio signals from a microphone that may be found in peripherals 840. In another embodiment, the audio system 850 may be a processor, such as processor 830, that processes sound. Additionally, the computer of FIG. 8 includes output devices 845. Examples of suitable output devices include speakers, printers, and the like.

The devices contained in the computer system of FIG. 8 are those typically found in general purpose computer, and are intended to represent a broad category of such computer components that are well known in the art. The system of FIG. 8 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

In a further embodiment, the present invention also includes a computer program product which is a computer readable medium (media) having computer instructions stored thereon/in which can be used to program a computer to perform the method of the present invention as shown in FIGS. 4 and 7. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

These same computer instructions may be located in an electronic signal that is transmitted over a data network that performs the method as shown in FIGS. 4 and 7 when loaded into a computer, such as the computer system 846 of FIG. 8. The computer instructions are in the form of data being transmitted over a data network. In one embodiment, the method of the present invention is implemented in computer instructions and those computer instructions are transmitted in an electronic signal through cable, satellite or other transmitting means for transmitting the computer instructions in the electronic signals.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of the present invention as described above.

Although the present invention has been described in detail with respect to certain embodiments and examples, variations and modifications exist which are within the scope of the present invention as defined in the following claims.

What is claimed is:

1. A computerized method for arranging advertising over a network comprising:

receiving one or more constraints related to an advertisement, wherein the one or more constraints define desired characteristics of one or more devices, target users or reception locations to whom the advertisement is to be delivered;

determining an estimated price for delivery of the advertisement, based on a selection of the one or more devices, target users or reception locations where the advertisement is to be delivered, wherein the one or more devices, target users or reception locations are selected to meet each of the one or more constraints; and sending the estimated price over the network;

wherein the determining comprises:

searching information related to the one or more devices, target users or reception locations, each having a profile, identifying the one or more devices, target users or reception locations by comparing the one or more constraints to the profiles of the one or more devices, target users or reception locations, and calculating, based on the identified one or more devices, target users or reception locations, the estimated price for delivering the advertisement to the identified one or more devices, target users or reception locations, wherein the calculating comprises:

determining an overall desirability for each of the one or more devices, target users or reception locations by: accessing at least one first value associated with each device, target user or reception location with respect to the one or more constraints, wherein the at least one first value indicates the desirability of the one or more devices, target users or reception locations with respect to the one or more constraints from a content distributor's perspective; accessing at least one second value, specified by the advertiser, with respect to the one or more constraints, wherein the at least one second value indicates the desirability of the one or more constraints from the advertiser's perspective; and computing the overall desirability for the one or more devices, target users, or reception locations based on the at least one first value and the at least one second value;

computing an individual price for delivering the advertisement to each of the one or more devices, target users or reception locations based on the overall desirability for each of the one or more devices, target users or reception locations, and computing the estimated price for delivering the advertisement to the one or more devices, target users or reception locations based on the calculated individual prices.

2. The method according to claim 1, wherein a broadcaster arranges the advertising.

3. The method according to claim 1, wherein the one or more constraints are received from an advertiser.

4. The method according to claim 3, further comprising placing an order, by the advertiser to a content distributor, to deliver the advertisement only to the one or more devices, target users or reception locations at the estimated price.

5. The method according to claim 4, further comprising delivering, after receiving the order for delivering the advertisement over the network, the advertisement only to the one or more devices, target users or reception locations.

6. The method according to claim 5, wherein the advertisement is delivered using an advertising period when transmitting content.

7. The method according to claim 5, wherein the advertisement is delivered during an advertising period when transmitting content.

8. The method according to claim 7, wherein the advertising period is allocated based on one or more delivery parameters.

9. The method according to claim 8, wherein the one or more delivery parameters are specified in the one or more constraints.

10. The method according to claim 7, wherein the advertising period is allocated with respect to the content to be delivered to each of the one or more devices, target users or reception locations.

11. The method according to claim 7, wherein
the advertising period is embedded in content to be transmitted to each of the one or more devices, target users or reception locations; and
the advertisement is delivered to each of the one or more devices, target users or reception locations and only to the one or more devices, target users or reception locations during transmission of the content, whether before, after, or by interrupting the content, or by placing the advertised product or service in the content itself and by inserting the advertisement into the advertising period.

12. The method according to claim 1, wherein the one or more constraints include a geographic constraint.

13. The method according to claim 1, wherein the one or more constraints includes a demographic constraint based on at least one of gender, income, age, or the number of targeted users at a device or reception location.

14. The method according to claim 1, wherein the one or more constraints include a time constraint, including at least one of a time frame within which the delivery of the advertisement is to be completed, a desired duration of each single exposure, or a desired repetition rate with respect to a unit time.

15. The method according to claim 1, wherein each first value is an index value for each constraint and each second value is a coefficient value for each constraint.

16. A computerized method for an advertiser, comprising:
receiving an estimated price, over a network, related to delivering an advertisement to one or more devices, target users or reception locations;
placing an order with a content distributor for delivering the advertisement to the one or more devices, target users or reception locations at the estimated price; wherein the one or more devices, target users or reception locations are selected as meeting one or more constraints which define desired characteristics of the one or more devices, target users or reception locations to whom the advertisement is being delivered; wherein the estimated price is computed by:
determining an overall desirability for each of the one or more devices, target users or reception locations, by: accessing at least one first value associated with each device, target user or reception location with respect to the one or more constraints, wherein the at least one first value indicates the desirability of the one or more devices, target users or reception locations with respect to the one or more constraints from a content distributor's perspective; accessing at least one second value, specified by the advertiser, with respect to the one or more constraints, wherein the at least one second value indicates the desirability of the one or more constraints from the advertiser's perspective; and computing the overall desirability for the one or more devices, target users, or reception locations based on the at least one first value and the at least one second value;
computing an individual price for delivering the advertisement to each of the one or more devices, target users or reception locations based on the overall desirability of each of the one or more devices, target users or reception locations; and
computing the estimated price for delivering the advertisement to the one or more devices, target users or reception locations based on the computed individual prices.

17. The method according to claim 16, wherein the one or more constraints define one or more delivery parameters based on which advertisement is to be delivered to each of the one or more devices, target users or reception locations.

18. The method according to claim 16, wherein the advertisement is delivered during an advertising period.

19. The method according to claim 18, wherein the advertising period is allocated based on the one or more delivery parameters.

20. The method according to claim 18, wherein the advertisement is delivered to the one or more devices, target users or reception locations and only to the one or more devices, target users or reception location during transmission of content for the one or more devices, target users or reception location, whether before or after, or by interrupting the content, or by placing the advertised product or service in the content itself and by inserting the advertisement into the allocated advertising period.

21. The method according to claim 18, wherein the advertising period is allocated in content to be delivered to a device, target user or reception location.

22. The method according to claim 16, wherein the estimated price is received from a content distributor which computes the estimated price based on the one or more devices, target users or reception locations selected using the one or more constraints.

23. The method according to claim 22, wherein the content distributor is a broadcaster.

24. The method according to claim 16, wherein the one or more constraints are provided by the advertiser prior to receiving the estimated price.

25. A computerized method for a content distributor, comprising:

selecting one or more devices, target users or reception locations based on one or more constraints related to an advertisement, wherein the one or more constraints define desired characteristics of the one or more devices, target users or reception locations to whom the advertisement is to be delivered;

calculating an estimated price for delivering the advertisement based on the one or more devices, target users or reception locations selected using the one or more constraints; and sending the estimated price over a network;

wherein the calculating of the estimated price comprises:

determining an overall desirability for each of the one or more devices, target users or reception locations, by: accessing at least one first value associated with each device, target user or reception location with respect to the one or more constraints, wherein the at least one first value indicates the desirability of the one or more devices, target users or reception locations with respect to the one or more constraints from a content distributor's perspective; accessing at least one second value, specified by the advertiser, with respect to the one or more constraints, wherein the at least one second value indicates the desirability of the one or more constraints from the advertiser's perspective; and computing the overall desirability for the one or more devices, target users, or reception locations based on the at least one first value and the at least one second value;

computing an individual price for delivering the advertisement to each of the one or more devices, target users or reception locations based on the overall desirability of each of the one or more devices, target users or reception locations, and computing the estimated price for delivering the advertisement to the one or more devices, target users or reception locations based on the calculated individual prices.

26. The method according to claim 25, further comprising receiving the one or more constraints prior to the determining.

27. The method according to claim 25, wherein the estimated price is sent to at least one advertiser.

28. The method according to claim 25, further comprising receiving an order from an advertiser to deliver the advertisement at the estimated price.

29. The method according to claim 28, further comprising delivering, after receiving the order, the advertisement to the one or more devices, target users or reception locations.

30. The method according to claim 25, wherein the one or more constraints define one or more delivery parameters based on which advertisement is to be delivered to each of the one or more devices, target users or reception locations.

31. The method according to claim 25, wherein the advertisement is delivered during an advertisement period.

32. The method according to claim 31, wherein the advertising period is allocated based on the one or more delivery parameters.

33. The method according to claim 31, wherein the advertising period is allocated in content to be delivered to a device, target user or reception location.

34. The method according to claim 31, wherein the advertising period is embedded in content to be transmitted to each of the one or more devices, target users or reception locations; and the advertisement is delivered to each of the one or more devices, target users or reception locations during transmission of the content, whether before or after, or by interrupting the content, or by placing the advertised product or service in the content itself and by inserting the advertisement into the advertising period.

35. The method according to claim 31, further comprising allocating, based on the one or more constraints, the advertising period in content scheduled to be transmitted to the one or more devices, target users or reception locations.

36. The method according to claim 35, wherein the advertisement is delivered during transmission of content using an advertising period allocated in the content to be transmitted to each of the one or more devices, target users or reception locations.

37. The method according to claim 25, wherein the determining comprises:

searching information related to a plurality of individuals or locations, each having a profile; and selecting the one or more devices, target users or reception locations by comparing the one or more constraints to the profiles of the plurality of individuals or locations and identifying the one or more devices, target users or reception locations whose profiles match the one or more constraints.

38. A computerized method for pricing individualized advertising over a network, comprising:

receiving one or more constraints to be used in determining one or more devices, target users or reception locations to which the advertisement is to be delivered;

selecting the one or more devices, target users or reception locations by comparing the one or more constraints to profiles of one or more of the devices, target users or reception locations; and calculating the estimated price for delivering the advertisement to the one or more devices, target users or reception locations based on a degree of match between each of the one or more devices, target users or reception locations and the one or more constraints, wherein the one or more constraints define desired characteristics of the one or more devices, target users or reception locations, wherein said the calculating of the estimated price comprises:

determining an overall desirability for each of the one or more devices, target users or reception locations, by: accessing at least one first value associated with each device, target user or reception location with respect to the one or more constraints, wherein the at least one first value indicates the desirability of the one or more devices, target users or reception locations with respect to the one or more constraints from a content distributor's perspective; accessing at least one second value, specified by the advertiser, with respect to the one or more constraints, wherein the at least one second value indicates the desirability of the one or more constraints from the advertiser's perspective; and computing the overall desirability for the one or more devices, target users, or reception locations based on the at least one first value and the at least one second value;

computing an individual price for delivering the advertisement to each device, target user or reception location based on the overall desirability of the one or more devices, target users, or reception locations; and computing the estimated price for delivering the advertisement to the one or more devices, target users or reception locations based on the calculated individual prices; and sending the estimated price over the network.

39. The method according to claim 38 wherein the one or more constraints define one or more delivery parameters based on which advertisement is to be delivered to each of the one or more devices, target users or reception locations.

40. The method according to claim 38, wherein each first value is an index value for each constraint and each second value is a coefficient value for each constraint.

41. A computerized system for advertising, comprising:
an advertiser processor capable of providing one or more constraints which define desired characteristics of one or more devices; and
an advertiser client coupled to the advertiser processor capable of receiving an estimated price and placing an order for delivering an advertisement at the estimated price; the estimated price being based on adding up individual prices for each device location; the individual prices being based on an overall desirability of the each of the one or more devices; the overall desirability based on at least one first and at least one second value, the at least one first value indicating a desirability of the one or more devices with respect to the one or more constraints from a content distributor's perspective, and the at least one second value indicating a desirability of the one or more constraints from an advertiser's perspective.

42. The system according to claim 41, wherein the one or more constraints define one or more delivery parameters based on which advertisement is to be delivered to each of the one or more devices.

43. The system according to claim 41, wherein the advertisement is delivered during an advertising period.

44. The system according to claim 43, wherein the advertising period is allocated based on the one or more delivery parameters.

45. The system according to claim 43, wherein the advertising period is allocated in content to be delivered to a device.

46. The system according to claim 43, wherein
the advertising period is embedded in content to be transmitted to each of the one or more devices; and
the advertisement is delivered to each of the one or more devices during transmission of the content by inserting the advertisement into the advertising period.

47. The system according to claim 41, wherein the one or more constraints include at least one of a demographic constraint or a geographic constraint.

48. The system according to claim 47, wherein the advertiser client is configured to:
receive an offer with the estimated price to deliver the advertisement to the one or more devices selected based on the one or more constraints; and
accept the offer by placing the order to deliver the advisement to the one or more devices at the advertised price.

49. The system according to claim 41, wherein the advertiser processor is a server.

50. The system according to claim 41, wherein the one or more constraints are received from the advertiser client.

51. The system according to claim 41, wherein a content distributor processor is configured to:
identify the one or more devices based on the one or more constraints; and calculate the estimated price based on the identified selected one or more devices.

52. The system according to claim 50, wherein a content distributor processor is configured to transmit content and/or advertising only to the one or more devices after receiving the order from the advertiser.

53. The system according to claim 41, wherein the advertiser client is configured to provide, prior to receiving the estimated price, the one or more constraints to be used in determining the one or more devices.

54. The system according to claim 53 wherein the pricing component is configured to:
calculate an individual price for delivering the advertisement to each of the one or more devices based on an overall demand for the one or more devices; and
compute the estimated price for delivering the advertisement to the one or more devices based on the individual prices computed with respect to delivering the advertisement to each of the one or more devices.

55. The system according to claim 54, wherein the content distributor processor is confined to transmit the advertisement and/or content embedded with an advertising period inserted with the advertisement only to the one or more devices.

56. The system according to claim 41, wherein the advertiser client is configured to solicit an offer for delivering the advertisement in a manner satisfying the one or more constraints prior to receiving the offer.

57. A computerized system for a content distributor, comprising:
a content distributor processor capable of delivering an advertisement to one or more devices selected as meeting one or more constraints which define desired characteristics of the one or more devices; and
a content distributor client coupled to the contend distributor processor, comprising:
an order component configured to receive and to process one or more constraints;
a profile component configured to identify the one or more devices which meet each of the one or more constraints; and
a pricing component configured to derive an estimated price to deliver the advertisement using the advertising period to the one or more devices during transmission of content, the one or more constraints defining desired characteristics of the one or more devices to which the advertisement is to be delivered; the estimated price based on calculated individual prices for delivering the advertisement to each of the one or more devices; each calculated individual price for delivering the advertisement to each of the one or more devices based on an overall desirability for each of the one or more devices, the overall desirability based on at least one first and at least one second value, the at least one first value indicating a desirability of the one or more devices with respect to the one or more constraints from a content distributor's perspective, and the at least one second value indicating a desirability of the one or more constraints from an advertiser's perspective.

58. The system according to claim 57, where the one or more constraints define one or more delivery parameters based on which advertisement is scheduled to be delivered to each of the one or more devices.

59. A computerized system for advertising, comprising:
a content distributor processor capable of delivering an advertisement to one or more devices; and a content distributor client coupled to the content distributor processor capable of soliciting an offer, over a network, for transmitting an advertisement at an estimated price to the one or more devices satisfying one or more constraints; the one or more constraints defining desired characteristics of the one or more devices to whom the advertisement is to be delivered; the estimated price based on calculated individual prices for delivering the advertisement to each of the one or more devices; the calculated individual prices based on an overall desirability for each of the devices; the overall desirability based on at least one first and at least one second value, the at least one first value indicating a desirability of the one or more devices with respect to the one or more constraints from a content distributor's perspective, and the at least one second value indicating a desirability of the one or more constraints from an advertiser's perspective.

60. The system according to claim 59, wherein the one or more constraints define one or more delivery parameters based on which advertisement is scheduled to be delivered to each of the one or more devices.

61. The system according to claim 59, wherein an advertiser client is configured to generate, prior to soliciting the offer, the one or more constraints to be used in determining the one or more devices.

62. The system according to claim 61, wherein the estimated price is determined based on a degree of match between each of the one or more devices and the one or more constraints.

63. A computerized system for an advertiser, comprising:
an advertiser processor capable of providing one or more constraints which define desired characteristics of one or more devices; and
an advertiser client coupled to the advertiser processor, comprising:
a receiving component configured to receive an offer for transmitting an advertisement at an estimated price to the one or more devices based on the one or more constraints; the one or more constraints defining desired characteristics of the one or more devices to whom the advertisement is to be delivered; the estimated price based on: individual prices for delivering the advertisement to each of the one or more devices; the individual prices based on an overall desirability for each of the one or more devices; the overall desirability based on at least one first and at least one second value, the at least one first value indicating the desirability of the one or more devices with respect to the one or more constraints from a content distributor's perspective, and the at least one second value indicating the desirability of the one or more constraints from an advertiser's perspective; and
an accepting component for accepting the offer over the network.

64. The system according to claim 63, wherein the one or more constraints define one or more delivery parameters a delivery parameter based on which advertisement is scheduled to be delivered to each of the one or more devices.

65. The system according to claim 63, wherein each first value is an index value for each constraint and each second value is a coefficient value for each constraint.

* * * * *